June 16, 1964  W. W. COOKE  3,137,541
PROCESS FOR THE PURIFICATION OF ALKALI METAL BICHROMATE
Filed April 28, 1960
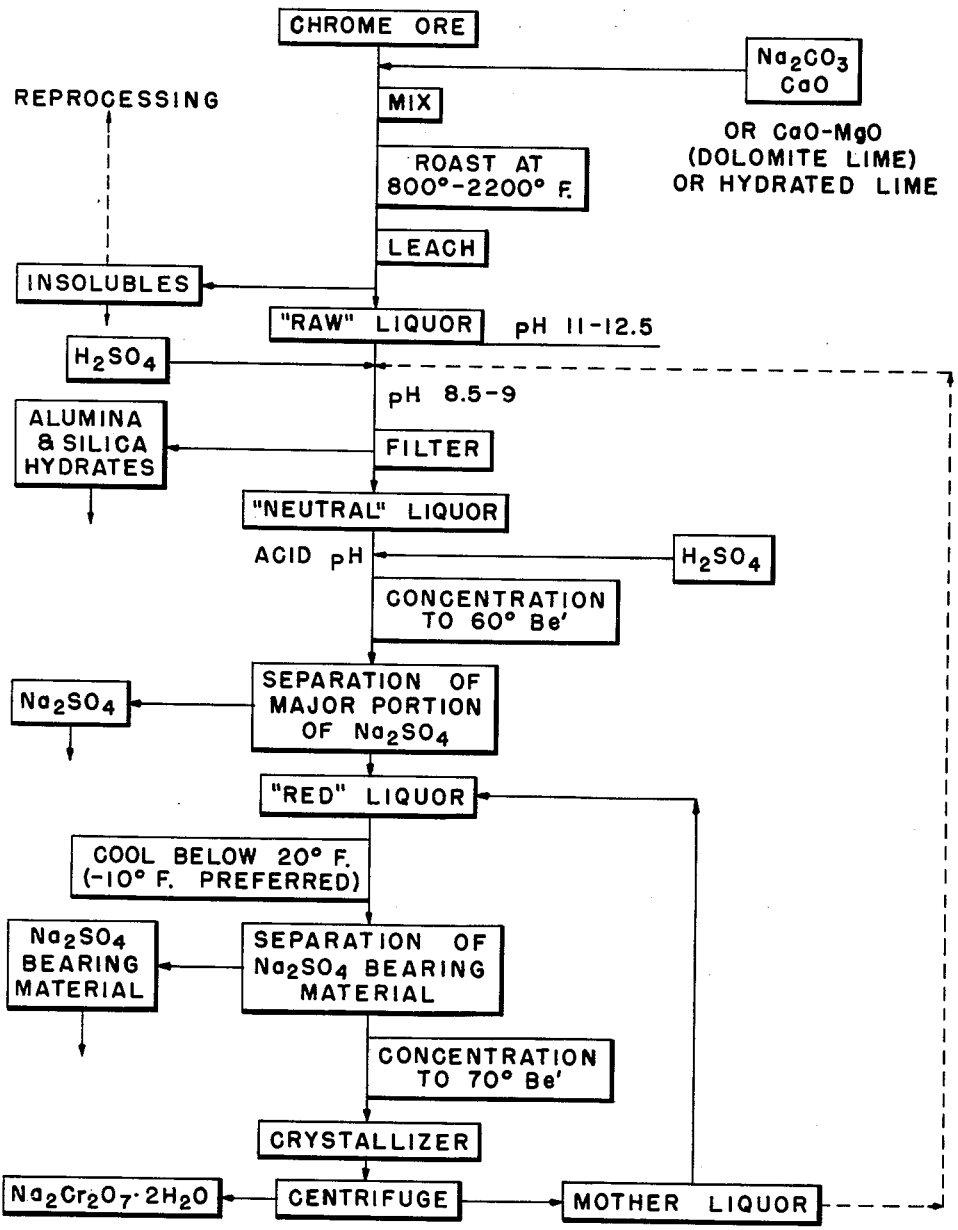
INVENTOR
WALTER W. COOKE, DECEASED
BY DOROTHY LIVERMORE COOKE, EXECUTRIX
BY Warburton & Cross
ATTORNEYS 3,137,541
PROCESS FOR THE PURIFICATION OF
ALKALI METAL BICHROMATE
Walter W. Cooke, deceased, late of Painesville, Ohio, by
Dorothy Livermore Cooke, executrix, Painesville, Ohio,
assignor to Diamond Alkali Company, Cleveland, Ohio,
a corporation of Delaware
Filed Apr. 28, 1960, Ser. No. 21,576
8 Claims. (Cl. 23—56)

This invention relates to a method for purifying aqueous liquors and more particularly relates to a method for removing sulfate ions from aqueous liquors obtained from the leaching of alkaline, chrome ore roast in the manufacture of chromate salts from chrome-bearing ores.

This application is a continuation-in-part of copending application Serial No. 733,002, filed May 5, 1958, now abandoned.

In the manufacture of alkali metal chromates and bichromates from chrome-bearing ores, it is customary to roast such ores with relatively large amounts of alkaline materials, such as alkali metal carbonates and alkaline earth metal carbonates, in order to oxidize the chrome-bearing constituents of the ore to alkali metal chromate compounds, and subsequently to leach the alkaline roast material with water in order to recover the soluble chromate salts thereof. Thereafter, the solution of alkali metal chromate salts is further processed in order to obtain the solid alkali metal chromate and bichromate salts. From the chemical substances in such processing of the alkali metal chromate liquors, the chromate and bichromate salts obtained therefrom become associated with appreciable, undesirable amounts of alkali metal and alkaline earth metal sulfates, particularly alkali metal sulfates. When the crystallization of the alkali metal chromates and alkali metal bichromates is attempted from such process liquors, the alkali metal sulfates associated therewith crystallize simultaneously and thereby contaminate said salts. When these chromate salts are subsequently used in the preparation of high grade chromium chemicals, such as chromic oxide from which chromium metal is to be made, the alkali metal sulfates therein contained are an undesirable impurity.

It has heretofore been proposed to remove the sulfate ions from alkali metal chromate process liquors by concentrating the liquors to about 60° Bé., and thereafter separating alkali metal sulfate from the liquor, as by filtration, decanting or centrifuging. By this method, however, it is not possible to reduce the sulfate content of the process liquors to less than about 0.5% by weight, which amount has been found to be undesirably high for the uses set forth hereinabove.

It has also been proposed to remove the sulfate ions from the alkali metal chromate process liquors by adding thereto an alkaline earth metal bichromate, such as calcium bichromate. By this means, the very insoluble calcium sulfate is formed, which is then removed from the chromate liquors by filtering, decanting, or centrifuging. Although the sulfate impurity content is thus diminished to a tolerable level, this method has the disadvantage that it introduces a calcium impurity into the bichromate liquor. Since this calcium impurity must in turn itself be removed from the liquors, this method, likewise, is not entirely satisfactory.

It is, therefore, an object of the present invention to provide a method for removing sulfate ion impurities from aqueous chromate process liquors whereby the sodium sulfate content is diminished to 0.1% by weight or less.

A further object of this invention is to provide a method whereby the sodium sulfate content of aqueous chromate process liquors is reduced to 0.1% by weight or less without the addition of another impurity to the bichromate liquor.

These and other objects will become apparent to those skilled in the art from the description of the invention which follows.

Referring now to the drawing which is attached hereto and forms a part hereof, FIGURE 1 is a chemical process flow-sheet of an alkali roast method of treating chrome ores to recover the chrome values therefrom, incorporating therein the teaching of the present invention.

As used hereinafter, in the specification and claims, the terms "alkali metal bichromate, alkali metal chromates, and alkali metal sulfates" refer to the bichromates, chromates and sulfates, respectively, of sodium, potassium, lithium, cesium, and rubidium. However, because of their ready availability and low cost, the bichromates, chromates and sulfates of sodium are preferred and specific reference to these compounds will, therefore, be made. Additionally, although the method of the present invention has been found to be applicable to chromate process liquors in general, it has been found to be particularly applicable to bichromate liquors and, hence, specific reference will be made hereinafter to such liquors.

It has now been found, in the practice of the present invention, that by removing the major portion of sulfate impurities from a bichromate liquor, as for example, by concentrating the liquor to about 60° Bé., and then cooling the liquor to below 20° F., preferably to about −10° F., substantially all of the sulfate impurities will be crystallized out of the bichromate liquor. In this manner, the sodium sulfate content of the bichromate liquor is diminished to at least 0.1% by weight or less.

Referring now to the drawings, a chrome-bearing ore is comminuted and mixed with sodium carbonate and calcium oxide or dolomitic lime (CaO—MgO) or hydrated lime. One purpose of the sodium carbonate is to react with the chromium oxide of the ore to form a water-extractable compound thereof. The sodium carbonate also reacts with the aluminum oxide in the ore, forming similar water-extractable compounds. The lime is employed primarily to maintain a granular consistency in the roast mix during the roasting process, which may suitably be carried out in a rotary kiln or other convenient roasting process means, and secondarily, to diminish the amount of water-extractable vanadium salts formed during the roasting of the ore, vanadium being present in such ores to a minor extent. The roasting of the mix is carried out at a temperature ranging between 2000° and 2200° F., after which the roast is leached with water and/or solutions from the process. As the result of the leaching step, an aqueous liquor containing sodium chromate, sodium vanadate, sodium aluminate, and other salts, and an insoluble residue are obtained. The liquor and residue may be separated by filtration or decanting. The insoluble residue may be discarded or may be reprocessed by being recycled in the roasting and leaching process hereinabove described, as indicated by the dotted line to the left of the main stream of the drawing. The leach liquor from the roast, designated in the drawings as "raw liquor," ordinarily has a pH within the range of 11 to 12.5. The "raw liquor" is treated with sulfuric acid, as for example, 78% acid, or with acidic solutions recovered in the process, to bring the pH of the "raw liquor" within the range of 8.5 to 9 in order to precipitate alumina and silica hydrates. The alumina and silica hydrates are derived from aluminum and silicon dioxide which occur in the ore in substantial quantities, of the order of 10–15% and 2–5%, respectively. The alumina and silica hydrates may be separated from the aqueous partially neutralized liquors by filtration at the filter, the filtrate then being referred to as "neutral liquor." The "neutral liquor" is next acidified with sulfuric acid, as for example, 78% acid or other acid-bearing material, whereupon the chromate ions are converted to bichromate ions in the solution.

Thereafter, the solution is concentrated to about 60° Bé., causing the major portion of the sodium sulfate impurities to crystallize, which impurities are then separated from the solution in any convenient manner, as by filtering, decanting, or centrifuging. The acid mother liquor after the removal of these sodium sulfate impurities is ferred to as "red liquor."

Thereafter, in accordance with the teachings of the present invention, the "red liquor" is cooled to below about 20° F., preferably to about −10° F. This cooling step results in the crystallization of sulfate-bearing materials, which are then separated from the "red liquor" in any convenient manner, as by filtering, centrifuging, or decanting. The "red liquor" is now found to contain not more than about 0.1% sodium sulfate by weight of bichromate.

The "red liquor" may then be further concentrated in order to crystallize the bichromate values therefrom. After suitable concentration, for example, to 70° Bé., and cooling, sodium bichromate crystallizes from the concentrated "red liquor" at the crystallizer and is centrifuged at the centrifuge to remove the "mother liquor." These crystals of sodium bichromate are found to be substantially free of any sulfate impurities.

Inasmuch as the "mother liquor" from the centrifuge has a pH very close to that of the "red liquor" from which the major portion of the sulfate has been removed, the "mother liquor" may be returned to the main stream via the "red liquor" for further concentration and crystallization of the bichromate dissolved therein, or it may be returned to the main stream as indicated by the dotted line to the right of the main stream of the drawing, as part of the acid required to neutralize the "raw liquor." It has been found that when using the method of the present invention to remove the sulfate ions from the bichromate liquor, there is no appreciable build-up of sulfate values in the system, by virtue of recycling the "mother liquor."

It will be appreciated that in the method of the present invention, the final sodium sulfate content of the bichromate liquor can be varied depending upon the temperature to which the liquor is cooled. Thus, although an appreciable diminishing of sulfate content is achieved by cooling the liquor to within the range of 10° to 20° F., for more complete removal of the sulfate impurities, a lower temperature is required. It has been found that temperatures of about −10° F. are sufficient to produce a bichromate liquor from which substantially sulfate-free bichromate crystals are obtained.

The length of time at which the bichromate liquor is maintained at this low temperature has not been found to be critical, except as to crystal size. However, the time must be sufficient to attain a thermal equilibrium in the liquor and crystallize out the sodium sulfate bearing compounds. This time will, of course, vary somewhat, according to the volume of liquor which is used as well as the type of equipment. A time of about 30 minutes has generally been found to be sufficient.

Although in the past, it has been believed that the solubility of sodium bichromate at 0° to −10° F. is 70%, in the practice of the present invention, this has been found not to be the case. Rather, it has been found that the solubility of sodium bichromate at 0° to −10° F. is between 67 and 68%. Thus, if, in the practice of the present method, the bichromate liquor which is cooled has a concentration in excess of about 68% by weight sodium bichromate, upon cooling, this excess will crystallize out of the solution with the sulfate, so that the final concentration of the liquor will not be in excess of about 68% by weight sodium bichromate. The crystallized material will then have to be processed in order to avoid excessive losses of bichromate. Although this processing operation is neither complex nor difficult, obviously, it is desirable to eliminate any additional steps in a process if at all possible. For this reason, it is preferred in the practice of the present invention to adjust the sodium bichromate concentration of the bichromate liquor so that it is not in excess of 68% by weight, generally 67–68%, prior to cooling the bichromate liquor so as to remove substantially all of the sulfate impurities, but substantially none of the bichromate.

It is to be noted, that contrary to what one might except, the method of the present invention is essentially specific to the removal of sulfate impurities from the bichromate liquor. This is evidenced by the fact that although the bichromate liquor customarily contains impurities other than the sulfate, e.g., chloride and vanadium, in substantially the same concentration as the sulfate, the cooling of the bichromate liquor does not effect any substantial reduction in the amount of these other impurities. This specificity of the present method to the removal of sulfate impurities is seen to be evidence of the unexpected results obtained by this method. Moreover, it has been further found that the crystals which are formed when the bichromate liquor is subjected to the cooling step contain better than 95% sodium bichromate and less than 5% sodium sulfate. This is seen to be further evidence that the present method involves more than an expected crystallization of impurities from a solution upon cooling inasmuch as in such a process, the crystals which are precipitated would be predominantly made up the impurities.

Although, at present, no explanation can be given as to why the method of the present invention should be specific to the removal of sulfate impurities from the bichromate liquor, to the exclusion of other impurities, such as chloride and vanadium, nor as to why the crystals which are formed upon cooling are predominantly sodium bichromate rather than sodium sulfate, it is known that these crystals are not a simple admixture of sodium sulfate and sodium bichromate. Rather, it is known that this material is a hydrated complex of sodium sulfate and sodium bichromate which is essentially polymeric in nature, having a molecule weight of about 1400 or greater. It is believed that because of the peculiar nature of this complex of sodium sulfate and sodium bichromate, it is removed from the bichromate liquor under conditions of cooling which are not effective in removing other impurities therefrom, such as vanadium and chloride. However, the exact mechanism by which this removal is accomplished during the cooling process of the present invention is not known and, therefore, no further explanation thereof will be attempted.

It is to be noted that although the exact mechanism by which the sulfate impurities are removed from the bichromate liquor during the cooling is not understood, it is known that because of the polymeric nature of the sulfate precipitate which is obtained upon cooling, it is essential that the major portion of the sulfate impurities be removed from the bichromate liquor prior to the time it is subjected to cooling. Where this is not done, the mass of the polymeric sulfate precipitated upon cooling is so great that separation thereof from the bichromate liquor is extremely difficult if not impossible. Moreover, it is found that if the bichromate liquor is cooled before removing the major portion of the sulfate impurities, the final sulfate content of the liquor is substantially the same, if not greater, as when the liquor is processed in the usual way without cooling, that is, the sulfate content is at least 0.5% by weight.

In order that those skilled in the art may better understand the method of the present invention and the manner in which it may be practiced, the following specific examples are given. It is to be understood, however, that these examples are merely illustrative of the present invention and are not intended to limit it.

Example I

A 400 cc. sample of "red liquor" containing 69.59% by weight $Na_2Cr_2O_7 \cdot 2H_2O$ and .438% $Na_2SO_4$ by weight of the $Na_2Cr_2O_7 \cdot 2H_2O$ is placed in a 400 cc. two-necked round bottom flask. In one neck of the flask a thermometer is inserted and in the other neck of the flask a stirrer is inserted. A cooling mixture of $CaCl_2$, $NaCl$, ice, and water is circulated around the flask. The liquor in the flask is cooled to the desired temperature with constant agitation and is kept at this temperature for a period of 4 hours. At the expiration of this time, the liquor is filtered using a Buchner funnel which is maintained at the same temperature as the liquor. The filtrate from the funnel is analyzed for $Na_2Cr_2O_7 \cdot 2H_2O$ and $Na_2SO_4$ content. The results obtained are as follows:

| Temperature of Cooling, °F. | Time of Cooling in Hrs. | Percent by Weight $Na_2Cr_2O_7 \cdot 2H_2O$ | Percent $Na_2SO_4$ by Weight $Na_2Cr_2O_7 \cdot 2H_2O$ |
|---|---|---|---|
| 32 | 4 | 68.82 | 0.4351 |
| 20 | 4 | 69.00 | 0.3078 |
| 10 | 4 | 67.72 | 0.1672 |
| 0 | 4 | 67.32 | 0.0695 |
| −10 | 4 | 67.43 | 0.0283 |

Example II

Using the same apparatus and materials as in Example I, a series of runs are made in which the temperature of the liquor is maintained at 0° F. for varying lengths of time. The results obtained are as follows:

| Temperature of Cooling, °F. | Time of Cooling in Hrs. | Percent by Weight $Na_2Cr_2O_7 \cdot 2H_2O$ | Percent $Na_2SO_4$ by Weight $Na_2Cr_2O_7 \cdot 2H_2O$ |
|---|---|---|---|
| 0 | ½ | 67.70 | 0.0895 |
| 0 | 1 | 67.45 | 0.0852 |
| 0 | 2 | 67.20 | 0.0729 |

From the above, it can be seen, that once the thermal equilibrium of the liquor has been attained, in about 30 minutes, little additional sulfate removal is obtained by holding the liquor at 0° F. for a longer period of time.

Example III

Using the procedure and apparatus of Example I, a 400 cc. sample of "red liquor" containing 66% by weight $Na_2Cr_2O_7 \cdot 2H_2O$ and .438% $Na_2SO_4$ by weight $$Na_2Cr_2O_7 \cdot 2H_2O$$

and a 400 cc. sample of "red liquor" containing 68% by weight $Na_2Cr_2O_7 \cdot 2H_2O$ and .438% $Na_2SO_4$ by weight $Na_2Cr_2O_7 \cdot 2H_2O$ are cooled to 0° F. and maintained at this temperature for ½ hour. At the expiration of this time, the "red liquor" is filtered and the filtrate analyzed for $Na_2Cr_2O_7 \cdot 2H_2O$ and $Na_2SO_4$ content. The results obtained are as follows:

| Original Wgt. Concentration of $Na_2Cr_2O_7 \cdot 2H_2O$ | Temperature, °F. | Percent by Wgt. $Na_2Cr_2O_7 \cdot 2H_2O$ after Filtering | Percent $Na_2SO$ by Wgt. $Na_2Cr_2O_7 \cdot 2H_2O$ after Filtering |
|---|---|---|---|
| *Percent* | | | |
| 66 | 0 | 66.14 | 0.1420 |
| 68 | 0 | 66.72 | 0.1130 |

It is noted that in neither of the above are any crystals of $Na_2Cr_2O_7 \cdot 2H_2O$ separated in the filtration.

As shown by the above, as contrasted with the results obtained in Example I, wherein a 70% solution of $Na_2Cr_2O_7 \cdot 2H_2O$ is used, there is no appreciable bichromate inclusion during the purification when the original "red liquor" has a concentration within the range of 66–68% of $Na_2Cr_2O_7 \cdot 2H_2O$.

Example IV

To illustrate the effects of crystallization on a previously purified sample of "red liquor," a 350 cc. sample of "red liquor" which has been purified in accordance with the method of Example III, and which contains 67.70% by weight $Na_2Cr_2O_7 \cdot 2H_2O$ and 0.0895% $Na_2SO_4$ by weight $Na_2Cr_2O_7 \cdot 2H_2O$, is taken. This sample is concentrated by boiling the solution up to 135° C. The sample is then cooled to 60° C. and filtered at this temperature. The filtrate is analyzed for $Na_2SO_4$ content. The results obtained show that the percent $Na_2SO_4$ by weight of the $Na_2Cr_2O_7 \cdot 2H_2O$ is 0.0574%.

Example V 6000 gallons of bichromate liquor from which the major portion of $Na_2SO_4$ had been removed by concentration to 60° Bé. is diluted with water to make a solution containing 67–68% bichromate by weight. The solution contained about .6% $Na_2SO_4$ by weight of sodium bichromate. This solution is cooled to −10° F. and the sulfate bearing compounds which crystallize out are removed by filtration. The bichromate filtrate is found to contain .067% $Na_2SO_4$ by weight of the sodium bichromate. This filtrate is concentrated to 70.5° Bé. by heating and cooled to 57° C. thereby crystallizing out sodium bichromate. 25,000 pounds of sodium bichromate crystals are obtained which are found to contain .015% $Na_2SO_4$ by weight of the sodium bichromate.

Example VI

The crystals precipitated in the ½ hour run in Example II are collected and dried. Analysis of these crystals gives the following composition in percent by weight:

| | Percent by wgt. |
|---|---|
| $Na_2Cr_2O_7 \cdot 2H_2O$ | 98.70 |
| $Na_2SO_4/Na_2Cr_2O_7 \cdot 2H_2O$ | 2.921 |

These results show that the precipitate formed upon cooling the bichromate liquor is predominantly sodium bichromate, rather than sodium sulfate, as would ordinarily be expected.

Example VII

To illustrate the specificity of the present method with regard to the removal of sulfate impurities to the exclusion of other impurities, a bichromate liquor is treated using the apparatus and method as set forth in Example I. The liquor is analyzed before and after treatment for sodium bichromate, sodium chloride, sodium sulfate and vanadium oxide. The results obtained are as follows:

| Material | Before Treatment | | After Treatment | |
|---|---|---|---|---|
| | g./l. | Percent | g./l. | Percent |
| $Na_2Cr_2O_7 \cdot 2H_2O$ | 1,178 | 69.56 | 1,109 | 67.25 |
| $NaCl/Na_2Cr_2O_7 \cdot 2H_2O$ | 2.42 | 0.205 | 2.69 | 0.242 |
| $Na_2SO_4/Na_2Cr_2O_7 \cdot 2H_2O$ | 5.45 | 0.462 | 0.876 | 0.079 |
| $V_2O_5/Na_2Cr_2O_7 \cdot 2H_2O$ | 1.44 | 0.122 | 1.52 | 0.137 |

From these results it is seen that not only is the sodium sulfate the only impurity which is removed from the bichromate liquor by cooling, but additionally, the sodium chloride and vanadium impurities are actually slightly increased after treatment. This is seen clearly to illustrate the surprising and unexpected results obtained with the present method.

While there have been described various embodiments of the invention, the methods and products described are not intended to be understood as limiting the scope of the invention as it is realized that changes therewithin are possible, and it is further intended that each element recited in any of the following claims is to be understood as referring to all equivalent elements for accomplishing substantially the same results in substantially the same or equivalent manner, it being intended to cover the invention broadly in whatever form its principle may be utilized.

What is claimed is:

1. A method for producing low sulfate content alkali metal bichromate liquors which liquors are contaminated with alkali metal sulfate impurities, which comprises concentrating such liquors to about 60° Bé. and crystallizing out the major portion of the alkali metal sulfate, removing such major portion of said alkali metal sulfate from said liquors, cooling the resulting liquor to a temperature below 20° F., thereby to co-crystallize substantially all of the remaining alkali metal sulfate as a sulfate-chromate complex, and separating the alkali metal sulfate chromate complex from the bichromate liquor.

2. The method as claimed in claim 1 wherein the alkali metal bichromate liquor is sodium bichromate liquor and the alkali metal sulfate is sodium sulfate.

3. In the method of preparing substantially sulfate-free alkali metal bichromate by mixing chrome-bearing ore with alkali metal carbonates and alkali earth metal oxides, roasting the mixture at temperatures between 2000° to 2200° F., leaching the mixture with an aqueous media, separating the liquid and solid portions of the thus-obtained aqueous mixture, treating the liquid portion of said mixture with an acid-bearing substance thereby precipitating alumina and silica hydrate therefrom, filtering the thus-obtained mixture thereby removing the alumina and silica hydrate, treating the filtrate with an acid-bearing substance, thereby converting the chromate-containing filtrate to a bichromate liquor containing alkali metal sulfate, concentrating the bichromate liquor to about 60° Bé., thereby causing the major portion of the alkali metal sulfate to crystallize, and separating the alkali metal sulfate from the bichromate liquor, the improvement which comprises cooling the bichromate liquor from which the major proportion of the sulfate has been removed to below 20° F., thereby co-crystallizing alkali metal sulfate and alkali metal bichromate out of the bichromate liquor, and separating the alkali metal sulfate and alkali metal bichromate from the bichromate liquor, thereby obtaining a sulfate content of less than about 0.1% by weight of the bichromate liquor.

4. The method as claimed in claim 3 wherein the bichromate liquor is cooled to −10° F.

5. The method as claimed in claim 4 wherein the low sulfate content bichromate liquor is concentrated and filtered, thereby producing substantially sulfate-free sodium bichromate crystals.

6. In the method of preparing substantially sodium sulfate-free sodium bichromate by mixing chrome-bearing ore with sodium carbonate and calcium oxide, roasting the mixture at temperatures between 2000° and 2200° F., leaching the mixture with water, separating the liquid and solid portions of the thus-obtained aqueous mixture, treating the liquid portion with sulfuric acid thereby precipitating alumina hydrate and silica hydrate therefrom, filtering the thus-obtained mixture to remove the alumina and silica hydrate, treating the filtrate with sulfuric acid, thereby converting the sodium chromate-containing filtrate to a sodium bichromate liquor containing sodium sulfate, concentrating the sodium bichromate liquor to about 60° Bé., thereby causing crystallization of the major portion of the sodium sulfate, and separating the sodium sulfate from the bichromate liquor, the improvement which comprises adjusting the concentration of the sodium bichromate liquor from which the major portion of the sodium sulfate is then removed to no more than 68% by weight sodium bichromate, cooling the sodium bichromate liquors to less than 20° F., thereby co-crystallizing sodium sulfate and bichromate out of the sodium bichromate liquor, and separating the co-precipitate of sodium sulfate and bichromate from the sodium bichromate liquor, thereby obtaining a low sulfate content sodium bichromate liquor of less than about 0.1% of the bichromate liquor.

7. The method as claimed in claim 6 wherein the sodium bichromate liquor is concentrated to within the range of 67–68% by weight sodium bichromate.

8. The method as claimed in claim 6 wherein the concentrated sodium bichromate liquor is cooled to −10° F.

References Cited in the file of this patent
UNITED STATES PATENTS 2,612,435     Perrin et al. _____ Nov. 13, 1948
2,839,359     Dunning _____ June 17, 1958

OTHER REFERENCES

Seidell's Book on "Solubilities of Inorganic and Organic Compounds," volume 1, second edition (1919), pp. 650 and 667, D. Van Nostrand Company, Inc., New York.

UNITED STATES PATENT OFFICE
CERTIFICATE OF CORRECTION

Patent No. 3,137,541            June 16, 1964

Walter W. Cooke, deceased,
by Dorothy Livermore Cooke, executrix

It is hereby certified that error appears in the above numbered patent requiring correction and that the said Letters Patent should read as corrected below.

Column 4, line 11, for "except" read -- expect --; column 5, Example III, in the last column of the table, after "Percent", for "$Na_2SO$" read -- $Na_2SO_4$ --.

Signed and sealed this 27th day of October 1964.

(SEAL)
Attest:

ERNEST W. SWIDER            EDWARD J. BRENNER
Attesting Officer            Commissioner of Patents